(12) United States Patent
Robbins et al.

(10) Patent No.: US 7,366,984 B2
(45) Date of Patent: Apr. 29, 2008

(54) PHONETIC SEARCHING USING MULTIPLE READINGS

(75) Inventors: Daryn E. Robbins, Duvall, WA (US); Marshall Christian Ramsey, Redmond, WA (US); Matthew David Klein, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/192,637

(22) Filed: Jul. 29, 2005

(65) Prior Publication Data

US 2007/0028168 A1 Feb. 1, 2007

(51) Int. Cl.
*G06F 15/00* (2006.01)
*G06F 17/00* (2006.01)

(52) U.S. Cl. .................. 715/535; 341/28; 345/171
(58) Field of Classification Search ................ 715/535; 341/28; 345/171

See application file for complete search history.

(56) References Cited

U.S. PATENT DOCUMENTS

| | | | | |
|---|---|---|---|---|
| 4,679,951 A | * | 7/1987 | King et al. | 400/110 |
| 5,893,133 A | * | 4/1999 | Chen | 715/535 |
| 7,002,491 B2 | * | 2/2006 | Robbins | 341/28 |
| 2002/0065794 A1 | * | 5/2002 | Fruensgaard et al. | 707/1 |
| 2005/0027524 A1 | * | 2/2005 | Wu et al. | 704/235 |
| 2005/0084152 A1 | * | 4/2005 | McPeake et al. | 382/173 |

* cited by examiner

*Primary Examiner*—Doug Hutton
*Assistant Examiner*—Henry Orr
(74) *Attorney, Agent, or Firm*—Merchant & Gould P.C.; Ryan T. Grace

(57) ABSTRACT

The names of contacts are stored as characters. Each character may include one or more phonic codes that are encoded into the character. A smart filter decodes the character into its constituent sounds. An input string is received that includes phonic codes. An application matches the decoded constituent sounds with the specified phonic codes from the input string in accordance with rules of the spoken language and character boundaries to determine a contact to display.

11 Claims, 3 Drawing Sheets

PHONETIC SEARCHING USING MULTIPLE READINGS

BACKGROUND

Some spoken languages can be written, for example, by using character sets that often number into a very large number of characters. In particular, the Chinese language comprises tens of thousands of characters. The Chinese character set includes characters, wherein each character is an ideograph that typically comprises many (as compared with Western character sets) strokes. The ideograph generally represents concepts (rather than sounds) although each ideograph is assigned a sound that corresponds to words in a Chinese language. Some of the Chinese characters may be associated with more than one sound or word in a Chinese language.

Because of the difficulties involved in entering such characters, several input methods for entering these characters have evolved. One input method editor (IME) uses the Pinyin system in which several characters are used to represent a sound that can represent a single word or character. Pinyin is a system of romanization of Chinese written characters such that Roman characters can be used to represent the phonetic sounds of the Chinese characters. Several Roman characters can be used to identify the Chinese character the user wishes to input. Other methods can include stroke-based entry for identifying characters, which can be used to select characters based on the number and types of strokes that are input.

Chinese can be entered into a computer system by users who select pinyin characters (or strokes) to select desired Chinese characters. Chinese characters are typically encoded (as two bytes) using a Unicode system. The encoded Chinese characters are typically used for storing information (such as words, names, places, and the like) because of the smaller size that is required when storing information using Chinese characters. (This background information is not intended to identify problems that must be addressed by the claimed subject matter.)

SUMMARY

This summary is provided to introduce a selection of concepts in a simplified form that are further described below in the Detail Description Section. This summary is not intended to identify key features or essential features of the claimed subject matter, nor is it intended to be used as an aid in determining the scope of the claimed subject matter.

According to aspects of various described embodiments, implementations are provided for creating a mechanism to search words of languages that, for example, use a single character to represent a single word. The word can comprise a plurality of phonetic codes. Accordingly, a datastore is used to store data to be searched that encodes single characters of the spoken language by using phonetic codes. In one aspect, an input string is received that comprises a sequence of entered phonetic codes, such that each entered phonetic code is associated with a sound of the spoken language. A character from the data to be searched is received. The received character is associated with sounds that are represented by the received character. The associated sounds are stored in a plurality of comparison strings, where each comparison string is different from each other and includes a sequence of phonetic codes that is associated with the received character. Finally, the phonetic codes of the input string and the phonetic codes of each of the comparison strings can be compared to determine whether a match exists.

According to another aspect, a computer-implemented system includes an application interface that is configured to receive an input string that includes a sequence of entered phonetic codes. The system also includes a filter for receiving the sequence of entered phonetic codes and for receiving a character from a datastore, where the characters are encoded using phonetic codes of a spoken language. The filter is also provided for decoding the received character into comparison strings where each comparison string comprises a sequence of phonetic codes that is associated with the received character and for comparing each comparison string with the sequence of entered phonetic codes.

According to another aspect, a computer-implemented system includes means for receiving an input string that comprises a sequence of entered phonetic codes. A datastore means is provided for storing and retrieving characters in a database that are encoded using phonetic codes of a spoken language. A filter means receives the sequence of entered phonetic code, receives a character from the datastore means, decodes the received character into comparison strings where each comparison string includes a sequence of phonetic codes that is associated with the received character, and compares each comparison string with the sequence of entered phonetic codes.

Embodiments may be implemented as a computer process, a computer system (including mobile handheld computing devices) or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Chinese text can be entered into a computer system by users who select pinyin characters that are associated with the desired Chinese characters. For example, a user (who desires to create, maintain, and use a contact list) can enter Pinyin (or, e.g., Bopomofo and the like) characters for a contact on a PDA that are converted by the PDA to Chinese characters. When searching for the contact names using Chinese characters, the process of matching contacts is complicated because some Chinese characters are associated with more than one sound. A "smart filter", used as an input method editor (IME), can make it possible for the user to search for contacts by using the same Roman (or Bopomofo, for example) characters used to input the characters via the IME. However, this solution does not allow for more than one Pinyin reading per character.

In accordance with aspects of the present invention, characters can be associated with multiple Pinyin readings and match those readings when a user searches using a Pinyin-based search. When a Chinese character is used in a contact name, the user is able to enter Pinyin characters when searching, and to retrieve accurate search results during and after input of the Pinyin characters that comprise a Chinese character. Accordingly, a Chinese character having multiple sounds can be used to phonetically search a contact list for matches.

Exemplary System for Phonetic Searching Using Multiple Readings

Figure 1:
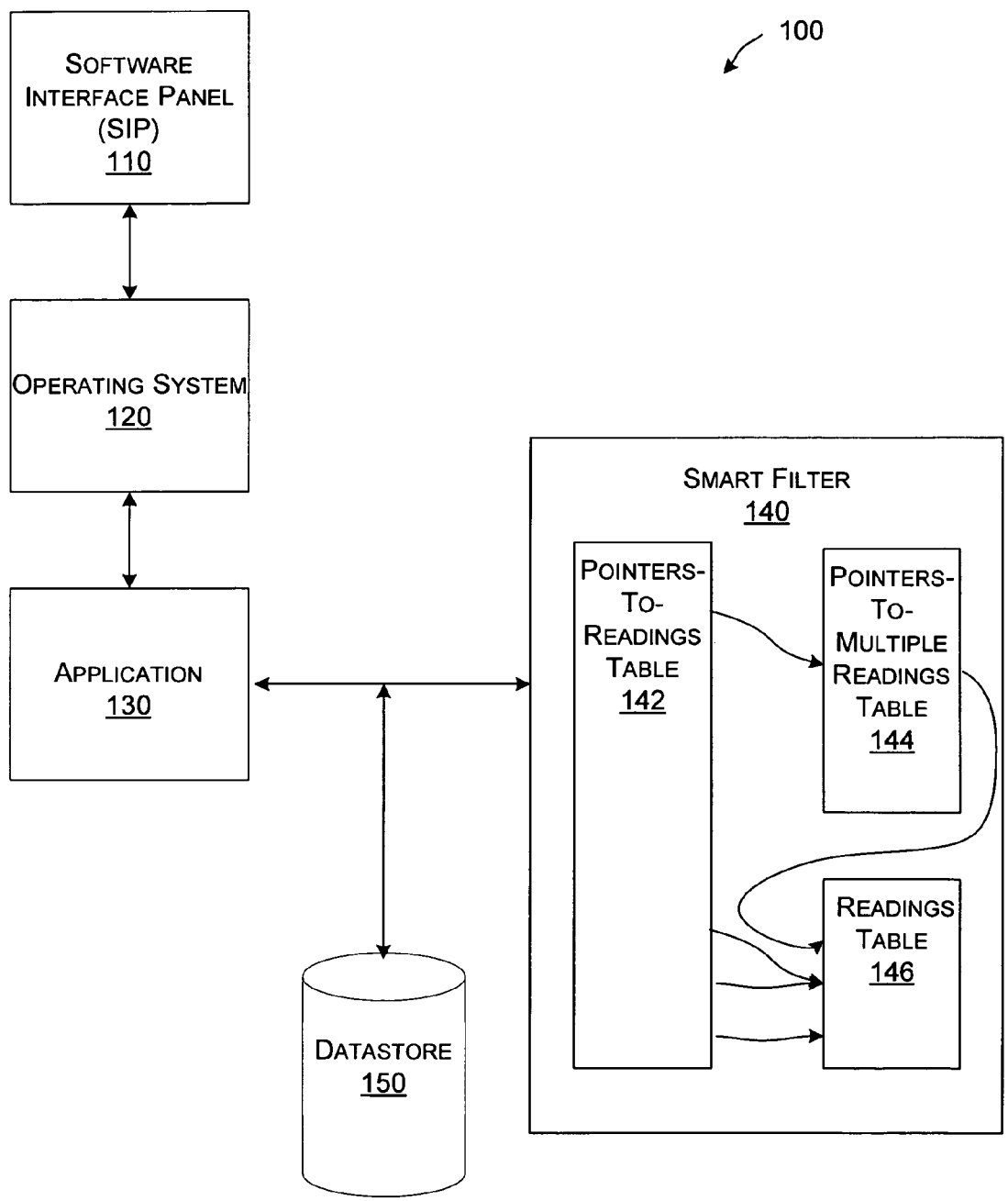
FIG. 1 illustrates an exemplary phonetic searching system 100 that can a phonetically search using multiple readings, according to one embodiment.

FIG. 1 illustrates an exemplary phonetic searching system 100 that can a phonetically search using multiple readings, according to one embodiment. In one embodiment, system 100 is implemented on a computer system, such as a mobile device, PDA, cell phone, and the like. System 100 comprises a software interface panel (110), an operating system (120), an application (130), a smart filter (140), and a datastore (150). In various embodiments, these (and other components) may be integrated logically and/or physically in various hardware/software configurations of components.

Software interface panel (SIP) 110 is any component that is configured to receive an input string from a user of system 100. In typical environments (such as in a mobile device), SIP 110 comprises a keypad using, for example, buttons and/or a display and touch screen combination. In operation, a user can use the SIP to enter an input string that corresponds to sounds (e.g., readings and/or phonetics) of a spoken language, such as Chinese. For example, the input string can be an initial set of keystrokes for selecting sounds for a name in a contact list for which the user desires to obtain stored information.

Operating system 120 is configured to operate SIP 110 as implemented, and in particular to handle the user interface such that an input string entered by a user can be retrieved. Operating system 120 notifies application 130 of the input string (or a change in the input string), typically through the use of an edit control. Accordingly, operating system 120 can inform application 130 of each change to the input string.

Application 130 is configured to receive the input string from operating system 120. Application 130 parses the input string to determine the phonetic codes specified by the input string. After application 130 determines which phonetic codes have been specified, the application attempts to match the specified phonetic codes from datastore 150 with information from the input string. As mentioned above, datastore 150 can be, for example, a contact list. The contact list can be a list of the user's personal contacts that uses the names of contacts as entry points into the contact list. Additionally, datastore can be any stored data in which the user desires to perform searching.

The names of the contacts are typically stored as characters, wherein each character can comprise one or more sounds (identified by the "Pinyin" in a Chinese language embodiment) that are encoded into a particular character. Accordingly, application 130 uses smart filter 140 to decode particular characters (from datastore 150) into their constituent sounds. Application 130 can then match the decoded constituent sounds with the specified phonetic codes from the input string in accordance with rules of the spoken language and character boundaries.

In one example, the smart filter comprises pointers-to-readings table 142, pointers-to-multiple readings table 144, and readings table 146. In operation, smart filter 140 can use the code values of any supplied characters (from datastore 150) as indexes into pointers-to-readings table 142. The pointers-to-readings table (142) comprises pointers, each of which point to a reading (Pinyin in a Chinese language embodiment) in readings table 146 that is associated with a supplied character. When a character has multiple readings (two, three, or more), a pointers-to-multiple readings table (144) can be used to supply pointers to the additional readings for the supplied character.

Because characters may have sounds in common, multiple pointers can point to a single reading in the reading table. The tables can be modified and/or combined and/or other data structures used to identify the readings implicated by the supplied characters. Accordingly, the smart filter can return the multiple readings for a single character by using look up tables.

As each key is pressed, the input string is concatenated with the key press and the list of contacts is filtered. The concatenated input string is then sent to the smart filter along with the characters from entries in the datastore 150 to determine whether there is a match. The smart filter takes each character from an entry in the datastore 150 and determines the input string needed to enter this character with the IME. The smart filter returns multiple matching strings for the about 10% of the Chinese characters that have multiple Pinyin readings.

The input strings are compared with readings determined by references to the three tables of smart filter 140. The first table (pointers-to-readings table 142) typically contains an entry for all 20,000+ Chinese characters. The mapping from Chinese character to the pointers-to-readings table entry is in accordance with the, for example, Unicode definition and need not be stored. The first entry in the pointers-to-readings table represents the first Chinese character in the Unicode range, and each following entry in the table matches each successive Unicode character.

The pointers-to-readings table entry represents entry points for searching both characters with one reading and characters with multiple readings. For characters with only one reading, the entry represents an index into another table (readings table 146) that contains all the possible Pinyin readings. For characters with multiple readings, the pointers-to-readings table entry represents the index into another table (the pointers-to-multiple readings table 144) which contains the indices for all the readings of the character in a predetermined order. The high order bit pointers-to-readings table entry can be set or unset to signify which type of entry a particular character uses. The high order bit can be ignored when determining the value of the index.

The second table (pointers-to-multiple readings table 144), which is used for characters with multiple readings, does not have an implied index. The pointers-to-multiple readings table entries also include an index into the reading table (146) of Pinyin readings. The high order bit (of the pointers-to-multiple readings table entry) can be used to signify whether the pointers-to-multiple readings table entry is another reading for the current character or the starting of another character.

When a character has multiple readings, the multiple pointers-to-readings table entry can have the high order bit set, such that the index can be used to find the first entry in the pointers-to-multiple readings table for this character. If the high order bit is unset, then the next contiguous entry in the pointers-to-multiple readings table can also include an index for this character.

Readings for this character can be retrieved until an entry with the high order bit set is encountered. The high order bit, for example, can be used to indicate that the last reading for this character has been encountered. The indexes for each entry of the pointers-to-multiple readings table (ignoring the high order bit) are index values into the readings table. Once the list of possible readings is found for a given character, the possible readings list can then compared to the input string. If the input string is a substring of the one of the possible readings (or, if one of the possible readings is a substring of the input string), then smart filter 140 can return that the input matches the character.

Although a Chinese language embodiment is described above, other embodiments may be used with other languages that use characters that include a plurality of phonetic codes.

Depending on the order of the data within the datastore, various methods can be used to search the entire datastore for particular entries.

Exemplary Flow for Phonetic Searching of Multiple Readings

Figure 2:
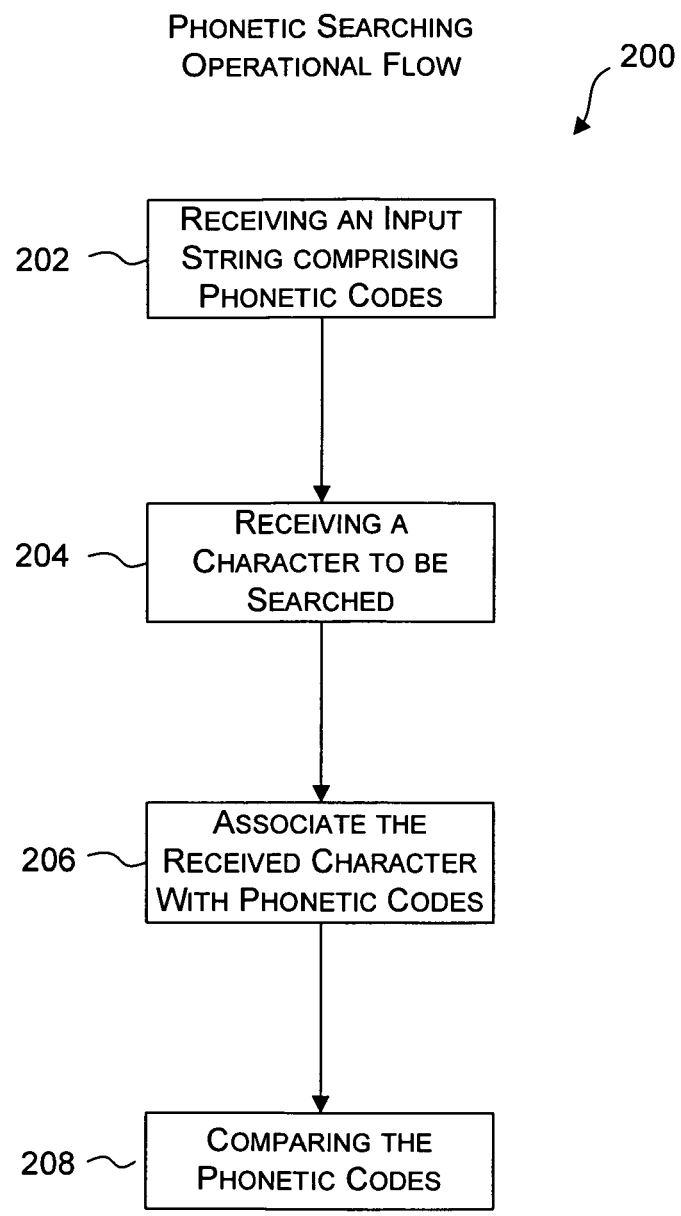
FIG. 2 illustrates an operational flow 200 for phonetic searching of multiple readings, according to one embodiment.
Figure 3:
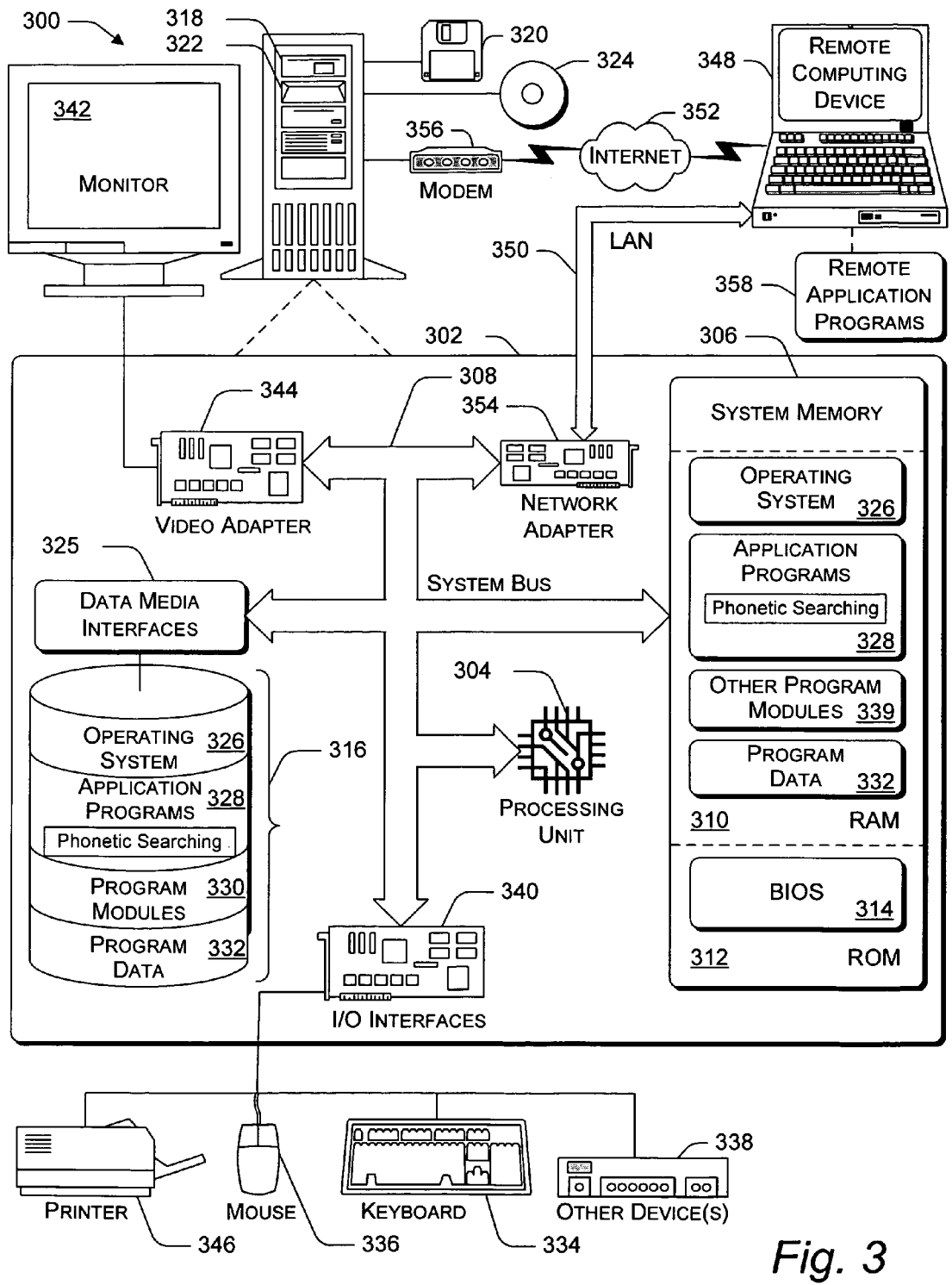
FIG. 3 illustrates a general computer environment 300, which can be used to implement the techniques described herein.

FIG. 2 illustrates an operational flow 200 for phonetic searching of multiple readings, according to one embodiment. Operational flow 200 may be performed in any suitable computing environment. For example, operational flow 200 may be executed by an application such as user application 130 (FIG. 1) or application programs 328 (FIG. 3, below) to perform the searching and comparison. Therefore, the description of operational flow 200 may refer to at least one of the components of FIGS. 1 and 3. However, any such reference to components of FIGS. 1 and 3 is for descriptive purposes only, and it is to be understood that the implementations of FIGS. 1 and 3 are a non-limiting environment for operational flow 200.

At a block 202, an input string comprising phonetic codes is received. Each single character of a spoken language is typically encoded using various phonetic codes. In one embodiment, the phonetic codes are entered by a user using text and/or graphical entry. The user can concatenate the input string with additional entries such that the input string comprises entered phonetic codes that are sufficient to identify a sequence of single characters of the spoken language. The input can be passed via an application interface to functionality listed below.

At a block 204, at least one character to be searched is received from data to be searched. The data to be searched can be, for example, a contact list that has entries, wherein each entry comprises a sequence of single characters of the spoken language to be searched. Each entry may contain, for example, a person's name and contact information. A sequence of characters from a data entry can be searched, and decoded into a sequence of phonetic codes that are associated with the additional received characters, such that the phonetic codes of the input string are compared with the sequence of phonetic codes that are associated with the additional received characters.

At block 206, the received character is associated with sounds that are represented by the received character. The associated sounds are stored in a plurality of comparison strings. Each string of phonetic codes includes a sequence of phonetic codes that is associated with the received character. Each of the strings typically comprises an alternate reading of the received character. In an embodiment, the received characters are decoded in accordance with rules of the spoken language (such as Chinese). As additional codes are entered by the user and a character boundary identified, a character match can be established, and another character from the data to be searched can be retrieved for decoding and searching.

At block 208, the phonetic codes of the input string are compared with phonetic codes of the comparison string. A search routine can comprise function calls for comparison of each of the comparison strings (looking for the presence or absence of matches, for example). In accordance with the example rules above, character boundaries can be determined, and searches performed in accordance with the boundaries. However, other rules can be applied that may allow ambiguities to exist in the character boundaries. In such cases, each potential case can be explored by using multiple and/or recursive calls to the comparison function invoked by a search routine.

Illustrative Operating Environment

FIG. 3 illustrates a general computer environment 300, which can be used to implement the techniques described herein. The computer environment 300 is only one example of a computing environment and is not intended to suggest any limitation as to the scope of use or functionality of the computer and network architectures. Neither should the computer environment 300 be interpreted as having any dependency or requirement relating to any one or combination of components illustrated in the example computer environment 300.

Computer environment 300 includes a general-purpose computing device in the form of a computer 302. The components of computer 302 can include, but are not limited to, one or more processors or processing units 304, system memory 306, and system bus 308 that couples various system components including processor 304 to system memory 306.

System bus 308 represents one or more of any of several types of bus structures, including a memory bus or memory controller, a peripheral bus, an accelerated graphics port, and a processor or local bus using any of a variety of bus architectures. By way of example, such architectures can include a Peripheral Component Interconnects (PCI) bus also known as a Mezzanine bus, a PCI Express bus (and the like), a Universal Serial Bus (USB), a Secure Digital (SD) bus, and/or an IEEE 1394, i.e., FireWire, bus.

Computer 302 may include a variety of computer readable media. Such media can be any available media that is accessible by computer 302 and includes both volatile and non-volatile media, removable and non-removable media.

System memory 306 includes computer readable media in the form of volatile memory, such as random access memory (RAM) 310; and/or non-volatile memory, such as read only memory (ROM) 312 or flash RAM. Basic input/output system (BIOS) 314, containing the basic routines that help to transfer information between elements within computer 302, such as during start-up, is stored in ROM 312 or flash RAM. RAM 310 typically contains data and/or program modules that are immediately accessible to and/or presently operated on by processing unit 304.

Computer 302 may also include other removable/non-removable, volatile/non-volatile computer storage media. By way of example, FIG. 3 illustrates hard disk drive 316 for reading from and writing to a non-removable, non-volatile magnetic media (not shown), magnetic disk drive 318 for reading from and writing to removable, non-volatile magnetic disk 320 (e.g., a "floppy disk"), and optical disk drive 322 for reading from and/or writing to a removable, non-volatile optical disk 324 such as a CD-ROM, DVD-ROM, or other optical media. Hard disk drive 316, magnetic disk drive 318, and optical disk drive 322 are each connected to system bus 308 by one or more data media interfaces 325. Alternatively, hard disk drive 316, magnetic disk drive 318, and optical disk drive 322 can be connected to the system bus 308 by one or more interfaces (not shown).

The disk drives and their associated computer-readable media provide non-volatile storage of computer readable instructions, data structures, program modules, and other data for computer 302. Although the example illustrates a hard disk 316, removable magnetic disk 320, and removable optical disk 324, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 316, magnetic disk 320, optical disk 324, ROM 312, and/or RAM 310, including by way of example, operating system 326, one or more application programs 328 (which can include phonetic searching as described above), other program modules 330, and program data 332. Each of such operating system 326, one or more application programs 328, other program modules 339, and program data 332 (or some combination thereof) may implement all or part of the resident components that support the distributed file system.

A user can enter commands and information into computer 302 via input devices such as keyboard 334 and a pointing device 336 (e.g., a "mouse"). Other input devices 338 (not shown specifically) may include a microphone, joystick, game pad, satellite dish, serial port, scanner, and/or the like. These and other input devices are connected to processing unit 304 via input/output interfaces 340 that are coupled to system bus 308, but may be connected by other interface and bus structures, such as a parallel port, game port, or a universal serial bus (USB).

Monitor 342 or other type of display device can also be connected to the system bus 308 via an interface, such as video adapter 344. In addition to monitor 342, other output peripheral devices can include components such as speakers (not shown) and printer 346 which can be connected to computer 302 via I/O interfaces 340.

Computer 302 can operate in a networked environment using logical connections to one or more remote computers, such as remote computing device 348. By way of example, remote computing device 348 can be a PC, portable computer, a server, a router, a network computer, a peer device or other common network node, and the like. Remote computing device 348 is illustrated as a portable computer that can include many or all of the elements and features described herein relative to computer 302. Alternatively, computer 302 can operate in a non-networked environment as well.

Logical connections between computer 302 and remote computer 348 are depicted as a local area network (LAN) 350 and a general wide area network (WAN) 352. Such networking environments are commonplace in offices, enterprise-wide computer networks, intranets, and the Internet.

When implemented in a LAN networking environment, computer 302 is connected to local network 350 via network interface or adapter 354. When implemented in a WAN networking environment, computer 302 typically includes modem 356 or other means for establishing communications over wide network 352. Modem 356, which can be internal or external to computer 302, can be connected to system bus 308 via I/O interfaces 340 or other appropriate mechanisms. It is to be appreciated that the illustrated network connections are examples and that other means of establishing at least one communication link between computers 302 and 348 can be employed.

In a networked environment, such as that illustrated with computing environment 300, program modules depicted relative to computer 302, or portions thereof, may be stored in a remote memory storage device. By way of example, remote application programs 358 reside on a memory device of remote computer 348. For purposes of illustration, applications or programs and other executable program components such as the operating system are illustrated herein as discrete blocks, although it is recognized that such programs and components reside at various times in different storage components of computing device 302, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A computer-implemented method for determining a contact associated with a character based on phonetic codes, the method comprising:
   associating a contact with a character;
   associating the character with a plurality of phonetic codes;
   storing the character;
   receiving an input string that includes an entered phonetic code;
   obtaining the character from storage;
   decoding the character to identify the plurality of phonetic codes associated with the character, wherein decoding the character includes identifying a code value associated with the character, associating the code value of the character with a pointer-to-reading table, wherein the pointer-to-reading table provides an index to a pointer-to-multiple-readings table, wherein the pointer-to-multiple-readings table provides an index into a readings table to identify the plurality of phonetic codes associated with the character;
   comparing the entered phonetic codes of the input string with the plurality of phonetic codes of the character to determine whether a match exists; and
   displaying the contact associated with the character when the match exists.

2. The computer-implemented method of claim 1, wherein the character is a Chinese character.

3. The computer-implemented method of claim 1, wherein the phonetic code includes Pinyin.

4. The computer-implemented method of claim 1, wherein the input string is a subset of one of the plurality of phonetic codes.

5. A computer-readable storage medium having computer-executable instructions for determining a contact associated with a character based on phonetic codes, the instructions comprising:
   associating a contact with a character;
   associating the character with a plurality of phonetic codes;
   storing the character;
   receiving an input string that includes an entered phonetic code;
   obtaining the character from storage;
   decoding the character to identify the plurality of phonetic codes associated with the character, wherein decoding the character includes identifying a code value associated with the character, associating the code value of the character with a pointer-to-reading table, wherein the pointer-to-reading table provides an index to a pointer-to-multiple-readings table, wherein the pointer-to-multiple-readings table provides an index into a readings table to identify the plurality of phonetic codes associated with the character;
   comparing the entered phonetic codes of the input string with the plurality of phonetic codes of the character to determine whether a match exists; and
   displaying the contact associated with the character when the match exists.

6. The computer-readable storage medium of claim 5, wherein the character is a Chinese character.

7. The computer-readable storage medium of claim 5, wherein the phonetic code includes Pinyin.

8. The computer-readable storage medium of claim 5, wherein the input string is a subset of one of the plurality of phonetic codes.

9. A system for determining a contact associated with a character based on phonetic codes, the system comprising:
   a processor;
   a memory having computer-executable instructions stored thereon, wherein the computer-executable instructions are configured to:
      associate a contact with a character;
      associate the character with a plurality of phonetic codes;
      store the character;
      receive an input string that includes an entered phonetic code;
      obtain the character from storage;
      decode the character to identify the plurality of phonetic codes associated with the character, wherein decoding the character includes identifying a code value associated with the character, associating the code value of the character with a pointer-to-reading table, wherein the pointer-to-reading table provides an index to a pointer-to-multiple-readings table, wherein the pointer-to-multiple-readings table provides an index into a readings table to identify the plurality of phonetic codes associated with the character;
      compare the entered phonetic codes of the input string with the plurality of phonetic codes of the character to determine whether a match exists; and
      display the contact associated with the character when the match exists.

10. The system of claim 9, wherein the phonetic code includes Pinyin.

11. The system of claim 9, wherein the input string is a subset of one of the plurality of phonetic codes.

* * * * *

UNITED STATES PATENT AND TRADEMARK OFFICE
CERTIFICATE OF CORRECTION

| | |
|---|---|
| PATENT NO. | : 7,366,984 B2 |
| APPLICATION NO. | : 11/192637 |
| DATED | : April 29, 2008 |
| INVENTOR(S) | : Daryn E. Robbins et al. |

It is certified that error appears in the above-identified patent and that said Letters Patent is hereby corrected as shown below:

In column 9, line 49, in Claim 1, delete "codes" and insert -- code --, therefor.

In column 10, line 18, in Claim 5, delete "codes" and insert -- code --, therefor.

In column 10, line 54, in Claim 9, delete "codes" and insert -- code --, therefor.

Signed and Sealed this
Twelfth Day of April, 2011

David J. Kappos
*Director of the United States Patent and Trademark Office*